United States Patent Office 3,423,378
Patented Jan. 21, 1969

3,423,378
COPOLYMERS OF PERFLUOROMETHACRYLYL FLUORIDE
David C. England, Wilmington, Del., assignor to E. I. du Pont de Nemours and Company, Wilmington, Del., a corporation of Delaware
No Drawing. Continuation-in-part of application Ser. No. 367,203, May 13, 1964. This application Sept. 26, 1967, Ser. No. 670,797
U.S. Cl. 260—80.8          10 Claims
Int. Cl. C08f 15/40, 15/02

ABSTRACT OF THE DISCLOSURE

Perfluoromethacrylyl fluoride can be copolymerized with various ethylenic comonomers using free radical catalysts to form plastic compositions.

The perfluoromethacrylyl fluoride component provides —COF side chains which can be used for post-polymerization reactions such as crosslinking to modify the properties of the copolymers.

RELATED APPLICATION

This application is a continuation-in-part of my co-assigned, copending application Ser. No. 367,203, now U.S. 3,362,990 filed May 13, 1964.

DESCRIPTION OF THE INVENTION

This invention relates to new copolymers of $\alpha,\beta$-unsaturated carboxylic acid halides with certain polymerizable ethylenic monomers.

The new products of this invention are copolymers of perfluoromethacrylyl fluoride, which has the formula $$CF_2=C(CF_3)-COF$$

with polymerizable comonomers of the type

where $X^1$ and $X^2$ are H or F; $X^3$ is H, F, Cl, lower alkyl or lower perfluoroalkyl; and $X^4$ is H, F, Cl, CN or COOR, R being lower alkyl (lower alkyl and lower perfluoroalkyl having 1–6 carbon atoms).

Unlike other methacrylic acid derivatives, perfluoromethacrylyl fluoride does not itself polymerize under the influence of the usual polymerization initiators such as free radical-generating catalysts, ultraviolet light or ionizing radiation. However, it does form copolymers with polymerizable ethylenic compounds, in particular those having the formula

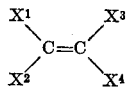

where $X^1$, $X^2$, $X^3$, and $X^4$ are as defined as above.

The products of this invention are random linear addition copolymers.

Examples of suitable comonomers include ethylene, propylene, n-hexene, vinyl chloride, vinyl fluoride, vinylidene fluoride, tetrafluoroethylene, trifluorochloroethylene, 1,1 - dichloro - 2,2 - difluoroethylene, 3,3,3-trifluoropropene, hexafluoropropene, perfluoro-1-octene, ethyl acrylate, n-butyl acrylate, methyl methacrylate, n-hexyl methacrylate, acrylonitrile, methacrylonitrile, ethyl $\alpha$-fluoroacrylate, methyl $\beta,\beta$-difluoroacrylate, $\alpha$-(trifluoromethyl)acrylonitrile, and the like. Two or more of these monomers can be polymerized simultaneously with perfluoromethacrylyl fluoride to give multi-polymer compositions.

Copolymerization is effected in the presence of the usual free radical-producing initiators, for example the diacyl peroxides such as diacetyl peroxide or dibenzoyl peroxide; the dialkyl peroxides such as di-tert.-butyl peroxide; the persalts such as the ammonium and alkali metal persulfates, perborates, or percarbonates; the azonitriles, particularly those described in U.S. Patent 2,471,959; dinitrogen difluoride; and the like. These agents need only be used in catalytic amounts, e.g., between 0.001 and 0.05 mole per mole of total comonomers. The polymerization is preferably carried out at a temperature in the range of 15–150° C., either at the autogenous pressure of the system or under additional pressure, which may be supplied by an inert gas or by a gaseous comonomer such as ethylene or vinyl fluoride. Inert solvents such as hydrocarbons or halogenated hydrocarbons may be used, particularly when the comonomer is gaseous or low boiling.

Depending upon the comonomer proportions and the operating conditions, the amount of polymerized perfluoromethacrylyl fluoride present in the copolymers may vary between about 0.20 and 85% by weight of the total copolymer. Generally, it is between 0.5 and 75% by weight.

The perfluoromethacrylyl fluoride copolymers contain reactive acid fluoride groups which can be converted to other groups such as ester or carbonamido groups by treatment of the polymer with appropriate reagents. In particular, these copolymers can be cross-linked by treatment with bifunctional reagents such as glycols or diamines. They have good stability to atmospheric moisture, although they are hydrolyzable by bases.

The preparation of monomeric perfluoromethacrylyl fluoride is described in detail in my aforementioned application Ser. No. 367,203.

The following examples illustrate the invention in greater detail:

Example 1

A bomb containing 18 g. of perfluoromethacrylyl fluoride, 50 cc. of 1,2,2-trichloro-1,1,2-trifluoroethane and 0.1 g. of di-tert.-butyl peroxide was heated to 130° C. and ethylene was introduced to a pressure of 600 atmospheres. The bomb was shaken at 130° C. for about one hour, during which time the ethylene pressure dropped to 540 atmospheres. The product from this reaction was a viscous solution which, after removal of volatile materials under reduced pressure, gave 6 g. of a rubbery polymer soluble in carbon tetrachloride. This material was a copolymer of ethylene and perfluoromethacrylyl fluoride, as shown by its infrared absorption which indicated the presence of —COF groups and by its fluorine content, 34.5%, corresponding to about 53% by weight of polymerized perfluoromethacrylyl fluoride. The polymer reacted vigorously with ethylenediamine to yield a crosslinked polymer insoluble in carbon tetrachloride.

Example 2

A mixture of 4.5 g. of perfluoromethacrylyl fluoride, 2.5 g. of methyl methacrylate and 0.05 g. of $\alpha,\alpha'$-azobisisobutyronitrile was sealed in a glass tube, mixed well and allowed to stand at room temperature. After a few days it was very viscous and after a week it had become solid. The tube was then opened to a Dry Ice-cooled trap and the volatile materials were removed by warming under reduced pressure on a steam bath. There were recovered 3.5 g. of perfluoromethacrylyl fluoride in the cold trap and 3.4 g. of solid polymer. The polymer was dissolved in warm chloroform and precipitated by adding methanol to the stirred solution. The precipitate was washed well with methanol and dried. The resulting methyl methacrylate/perfluoromethacrylyl fluoride copolymer contained 0.35% of fluorine, indicating the presence of about 0.5% by weight of polymerized perfluoromethacrylyl fluoride.

Example 3

A mixture of 4.5 g. of perfluoromethacrylyl fluoride, 1.4 g. of acrylonitrile and 0.05 g. of $\alpha,\alpha'$-azobisisobutyronitrile was sealed in a glass tube, mixed well and allowed to stand at room temeperature. In a week it had set to a solid powder which was removed and continuously extracted with diethyl ether for four hours, then dried. The resulting acrylonitrile/perfluoromethacrylyl fluoride copolymer contained 1.1% of fluorine, corresponding to a content of about 1.7% by weight of polymerized perfluoromethacrylyl fluoride.

Example 4

A small platinum tube was charged at low temperature with 2.12 g. of perfluoromethacrylyl fluoride, 1.34 g. of tetrafluoroethylene, 6 mg. of dinitrogen difluoride and, as the reaction medium, 2 ml. of the thermal dimerization product of hexafluoropropene (see U.S. Patent 2,957,032). The tube was sealed and heated for 4 hours at 70° C. under a hydraulic pressure of 3000 atmospheres. The resulting solid reaction product was washed well with hexafluoropropene dimer, then with water, and dried under reduced pressure. There was obtained 1.25 g. of a white polymer, softening at 310° C. This product was a copolymer of tetrafluoroethylene and perfluoromethacrylyl fluoride, as shown by its infrared spectrum which contained the characteristic bands of both components.

Example 5

A mixture of 3 g. of perfluoromethacrylyl fluoride, 0.5 g. of dilauroyl peroxide and 200 ml. of 2,2,3,3-tetrafluoropropyl acetate was placed in a shaker tube. The tube was cooled to —80° C. and evacuated, and 140 g. of vinylidene fluoride and 35 g. of tetrafluoroethylene were added to its contents. The tube was then sealed and heated to 60–62° C. in one hour with agitation. A vigorous exothermic reaction took place, the reaction temperature increasing to 160° C. while the pressure decreased from 850 p.s.i. to 600 p.s.i. After cooling, the reaction mixture was diluted with ethanol and the precipitated solid was collected by filtration, washed with ethanol and dried. There was obtained 89 g. of a terpolymer of vinylidene fluoride, tetrafluoroethylene and perfluoromethacrylyl fluoride containing approximately 0.2% by weight of polymerized perfluoromethacrylyl fluoride, as shown by nuclear magnetic resonance analysis.

A 12% solution of this copolymer in methyl ethyl ketone was prepared and applied to a strip of anodized aluminum. After the solvent had evaporated, the strip was baked at 232° C. for one minute. This resulted in the formation of a clear, glossy coating film on the metal. An X was cut in the film and the strip was immersed in boiling water for 24 hours. There was no indication of film delamination after this treatment.

Example 6

A platinum tube ½" in diameter was charged with 3.5 g. (0.002 mole) of perfluoromethacrylyl fluoride, 0.92 g. (0.02 mole) of vinyl fluoride, and 0.020 g. of $\alpha,\alpha'$-azobisisobutyronitrile. The tube was sealed and then heated at 70° C. under 910–1000 atmospheres pressure for 10 hours. The tube was opened and there was observed an odor of excess perfluoromethacrylyl fluoride monomer. The solid polymer in the tube was removed and dried in vacuo at 75° C. for 5 hours. The resulting product was a tough odorless copolymer of perfluoromethacrylyl fluoride and vinyl fluoride amounting to 4.1 g. (yield, 93%). A film of this copolymer was prepared by pressing at 200° C. under 6000 p.s.i. The infrared absorption spectrum of this film showed the presence of acid fluoride, —COF, groups at $5.4\mu$.

Another copolymer of perfluoromethacrylyl fluoride and vinyl fluoride, prepared in the same way was found by analysis to contain 54.80% fluorine. This corresponds to a monomer ratio of 2.7 vinyl fluoride to 1 perfluoromethacrylyl fluoride or 59.2% by weight of polymerized perfluoromethacrylyl fluoride. A sample of this copolymer was subjected to thermogravimetric analysis, in which the temperature of the sample was raised 6° C. per minute in air. The sample lost 5% of its weight at 200° C.

Example 7

A platinum capsule ⅜" x 6" was charged with 3.7 g. (0.02 mole) of perfluoromethacrylyl fluoride, 0.56 g. (0.02 mole) of ethylene, and 0.020 g. of $\alpha,\alpha'$-azobisisobutyronitrile. The tube was sealed and heated at 70° C. under 1000 atmospheres pressure for 10 hours. The tube was cooled in liquid nitrogen and then opened. There was obtained a solid copolymer of perfluoromethacrylyl fluoride and ethylene which, after drying in vacuo, amounted to 1.55 g. (yield, 30%). This polymer was pressed into a film at 140° C. and 6000 p.s.i. The infrared absorption spectrum of this film showed absorption at $3.4\mu$ due to C—H and $5.4\mu$ due to the presence of —COF groups. Elemental analysis of this copolymer showed 47.33% fluorine, which corresponds to a monomer ratio of 2.27 ethylene to 1 perfluoromethacrylyl fluoride, or 74.3% by weight of polymerized perfluoromethacrylyl fluoride.

Example 8

A platinum capsule ⅜" x 6" was charged with 3.6 g. (0.02 mole) of perfluoromethacrylyl fluoride, 2.0 g. (0.02 mole) of tetrafluoroethylene, and 2 ml. of $N_2F_2$. The tube was then sealed and heated at 70° C. under 3000 atmospheres pressure for 4 hours. After opening the tube, there was an odor of perfluoromethacrylyl fluoride monomer. The crude solid polymer was dried at 100° C. at 0.1 mm. pressure and there was obtained 1.88 g. (33% yield) of copolymer of perfluoromethacrylyl fluoride and tetrafluoroethylene. The infrared absorption spectrum showed weak but definite absorption at $5.4\mu$ indicating the presence of perfluoromethacrylyl fluoride units in the copolymer. In an isothermal thermogravimetric analysis at 300° C., this copolymer lost 0.4% of its weight while being heated to 300° C. and lost an additional 0.6% of its weight after 5 hours at 300° C.

Example 9

A ¾" platinum tube was charged with 25.0 g. (0.14 mole) of perfluoromethacrylyl fluoride, 9.0 g. (0.14 mole) of vinylidene fluoride and 0.140 g. of $\alpha,\alpha'$-azobisisobutyronitrile. The tube was sealed and heated at 70° C. under 700–900 atmospheres pressure for 15 hours. The tube was then opened, unreacted perfluoromethacrylyl fluoride was removed, and a solid elastomeric polymer of perfluoromethacrylyl fluoride and vinylidene fluoride was isolated. The above procedure was repeated for a total of 32 preparations and the products of all the runs were combined. After drying in vacuo, there was obtained a total of 523 g. of copolymer. The crude composite sample of polymer was dissolved in ethyl acetate, precipitated with benzene, and dried in vacuo to give 446 g. of copolymer. A portion of this copolymer was pressed into a film at 200° C. The infrared absorption spectrum for this film showed absorption at $5.4\mu$ which shows the presence of —COF groups.

Example 10

Another sample of copolymer of perfluoromethacrylyl fluoride and vinylidene fluoride was prepared in the same way as described in Example 9 from 3.7 g. of perfluoromethacrylyl fluoride and 1.28 g. of vinylidene fluoride. This copolymer was found to contain 60.43% fluorine by elemental analysis. This corresponds to a monomer ratio of 12 vinylidene fluoride to 1 perfluoromethacrylyl fluoride, or 18.8% by weight of polymerized perfluoromethacrylyl fluoride. Another sample of this copolymer had an inherent viscosity of 1.06, measured at 0.25% concentration in ethyl acetate at 25° C. and had a glass transition point ($T_g$) of −1° C. This sample was subjected to isothermal thermogravimetric analysis at 300° C. The copolymer lost 1.31% of its weight in going to 300° C. and an additional 1.5% of its weight after 5 hours at 300° C.

Example 11

A 1.0 g. sample of the perfluoromethacrylyl fluoride/vinylidene fluoride copolymer of Example 9 was dissolved in 25 ml. of ethyl acetate at 50° C., about 1 hour being required. This solution was stirred magnetically, 5 ml. of methanol was added, and the reaction mixture was stirred an additional 24 hours. The polymer was precipitated by the addition of water. It was thoroughly washed with water and vacuum-dried to give a rubbery solid. A film of this copolymer was prepared by pressing at 200° C. under 6000 p.s.i. pressure. The film was tan, semi-transparent and elastomeric. The infrared absorption spectrum of the film showed absorptions at 5.37μ and 5.70μ of almost equal intensity, this indicating approximately a 50:50 mixture of —COF and —COOCH$_3$ groups in the copolymer.

Example 12

A 1.0 g. sample of the perfluoromethacrylyl fluoride/vinylidene fluoride copolymer of Example 9 was dissolved in 25 ml. of methyl acetate at 50° C., then 5 ml. of methanol and 5 ml. of pyridine were added and the solution stirred magnetically for an additional 25 hours. The polymer was precipitated with water, washed with water, and dried in vacuo. A film was pressed from this product at 200° C. under 6000 p.s.i. pressure. The film was transparent and elastomeric. Its recovery properties, after stretching, were superior to that of the starting perfluoromethacrylyl fluoride/vinylidene fluoride copolymer. The infrared absorption spectrum of the film showed absorption at 5.65–5.7μ and no absorption between 5.0 and 5.5μ. This showed that the pendant —COF groups of the polymer were quantitatively converted to —COOCH$_3$ groups.

Example 13

To a solution of 50 g. of the perfluoromethacrylyl fluoride/vinylidene fluoride copolymer of Example 9 in 750 ml. of methyl acetate in a flask equipped with a reflux condenser and paddle stirrer, and immersed in an oil bath at 50° C., there was added 100 ml. of concentrated ammonium hydroxide solution. The solution was stirred for 48 hours. The polymer was precipitated by the addition of water and then finely ground in a high-speed blender with water. The product was dried in vacuo at 75° C. for 4 hours, and there was obtained 46.2 g. of a copolymer of perfluoromethacrylamide and vinylidene fluoride. This copolymer was pressed into a film at 200° C. and 6000 p.s.i. pressure. The infrared absorption spectrum of the film showed strong absorption at 5.9μ and 6.2μ, which was consistent with the conversion of the —COF groups to —CONH$_2$ groups.

The copolymers of this invention are characterized by ability of crosslink and are suitable for the preparation of self-supporting films and sheetings; of molded articles; for forming adherent coatings on metals; and for the impregnation or coating of porous or semi-porous materials such as paper, textiles, wood, etc. to contribute such properties as strength, toughness and impermeability.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A random linear addition of $CF_2=C(CF_3)$—COF and at least one polymerizable comonomer of the formula

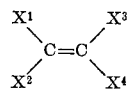

wherein $X^1$ and $X^2$ are each of the group consisting of H and F; $X^3$ is of the group consisting of H, F, Cl, lower alkyl and lower perfluoroalkyl; and $X^4$ is of the group consisting of H, F, Cl, CN and

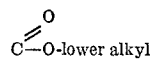

2. The copolymer of claim 1 wherein the

is present in an amount between about 0.25 and 85 percent by weight of the total copolymer.

3. The copolymer of claim 2 in which the comonomer is ethylene.

4. The copolymer of claim 2 in which the comonomer is methylmethacrylate.

5. The copolymer of claim 2 in which the comonomer is vinyl fluoride.

6. The copolymer of claim 2 in which the comonomer is vinylidene fluoride.

7. The copolymer of claim 2 in which the comonomer is tetrafluoroethylene.

8. A random linear addition copolymer of perfluoromethacryl amide and vinylidene fluoride.

9. A random linear addition copolymer of perfluoromethacrylyl fluoride, methyl perfluoromethacrylate and vinylidene fluoride.

10. A random linear addition copolymer of methyl perfluoromethacrylate and vinylidene fluoride.

References Cited

UNITED STATES PATENTS

| | | | |
|---|---|---|---|
| 2,440,090 | 4/1948 | Howk et al. | 260—544 X |
| 2,472,812 | 6/1949 | Dickey | 260—544 X |
| 2,554,947 | 5/1951 | Joos | 260—486 |
| 2,891,991 | 6/1959 | Stewart et al. | 260—486 |
| 3,068,212 | 12/1962 | Jenkens | 260—85.5 |
| 3,084,143 | 4/1963 | Hieserman et al. | 260—85.5 |

OTHER REFERENCES

Cheburkov et al.: "Izv. Akad. Nauh, SSSR, Ser. Khim" (1963) (9), pp. 1570-2.

JOSEPH L. SCHOFER, *Primary Examiner.*

STANFORD M. LEVIN, *Assistant Examiner.*

U.S. Cl. X.R.

260—85.5, 86.3, 87.5, 87.7, 88.1, 544, 86.1